Oct. 1, 1929.　　L. P. LAROSE　　1,730,221

HYDROMETER

Original Filed June 23, 1926

Inventor
Louis P. Larose
By Attorneys
Southgate Fay & Hanley

Patented Oct. 1, 1929

1,730,221

UNITED STATES PATENT OFFICE

LOUIS P. LAROSE, OF WEST BROOKFIELD, MASSACHUSETTS

HYDROMETER

Application filed June 23, 1926, Serial No. 118,068. Renewed August 2, 1928.

The principal objects of this invention are to provide a hydrometer with an inside float that is non-breakable and with a scale that will have a longer range of reading than usual for the same length of hydrometer; to provide a hydrometer that has increased accuracy because of doing away with capillary action on the inside of the case and the outside of the float; to provide a hydrometer in which it ends will be leak-proof, and to provide a hydrometer arranged on the same principle that may be provided with a thermometer in the float to make the readings accurate irrespective of temperature of the solution tested.

Other objects and advantages of the invention will appear hereinafter.

Reference is to be had to the accompanying drawings in which

Figure 1:
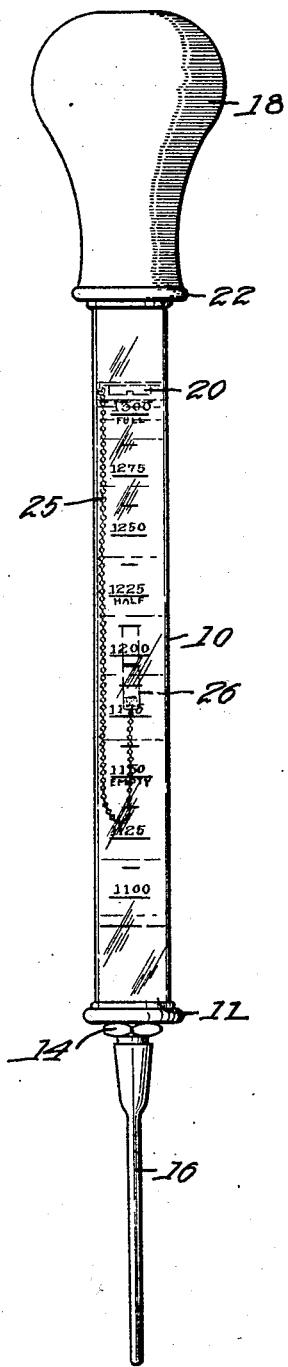
Fig. 1 is a side view of a hydrometer constructed in accordance with this invention for use in testing batteries, etc.
Figure 2:
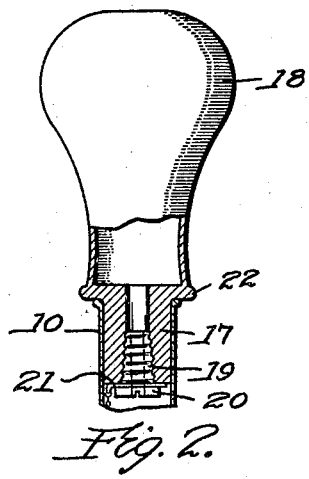
Figs. 2 and 3 are central sectional views of the upper and lower ends of the glass or other transparent tube respectively showing the way to connect the rubber elements.
Figure 3:
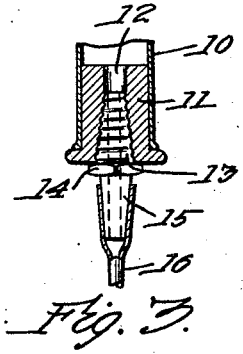
Figure 4:
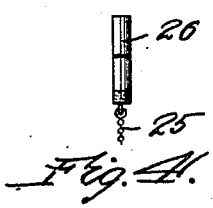
Fig. 4 is a side view of the float by itself.

Referring to Figs. 1, 2, 3 and 4, the hydrometer is shown with a transparent tube 10, which may have a flat side or a round one, provided with a scale for use in testing a battery. This tube is shown as being provided with a plug of soft rubber at each end. At the lower end, this plug 11 is provided with a wide passage 12 throughout its length and into it screws an inner plug 13 of hard material, as hard rubber or lead, also having a passage therethrough. It is shown with a polygonal projection 14 outside for use in screwing it in. It also has an integral projection 15 extending into and holding a connection 16 in the form of a short hose or the like.

At the other end a similar soft plug 17 is employed which constitutes the bottom of the bulb 18 which is used in filling and emptying the glass tube 10. In this case a hard plug 19, which is similar to the plug 13 is used for the same purpose. It is provided with a head 20 and a plate 21 adapted to be held in under this head. The plug, of course, is provided with a perforation for the obvious purpose.

It will be noted that these plugs 13 and 19 when screwed in, force out the softer material 11 or 17 against the interior of the glass tube and therefore hold the latter plug firmly in position. This avoids almost entirely the leakage which gradually occurs in the hydrometers on the market. Both of these plugs also have a flange 22 around the edge of the tube against which the tube is set up.

The plate 21 is provided with a chain 25 or other flexible connection of lead or hard rubber which extends down into the hydrometer. The chain is shown as about the length of the tube but that is not necessary. The float 26, which may be of hard rubber or other material that will not be injured by the acids with which it is used, is connected at its bottom with this chain 25. It has a definite mark on it for reading on the scale. It will rise in the tube the same as any other hydrometer except that the higher it goes in the liquid, the more chain depends from it. Thus more weight is added to it as it rises. The calibration is uniform, the distance or length of scale being controlled by the ratio of the weight of the chain compared to the size of the float.

This instrument so far described may be used for indicating the degree of charge of a storage battery. It involves several improvements over those ordinarily in use and is a complete instrument in itself.

Figure 5:
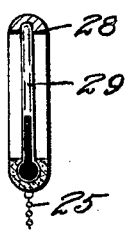
Fig. 5 is a sectional view of another form of float that can be used, having a thermometer therein.
Figure 6:
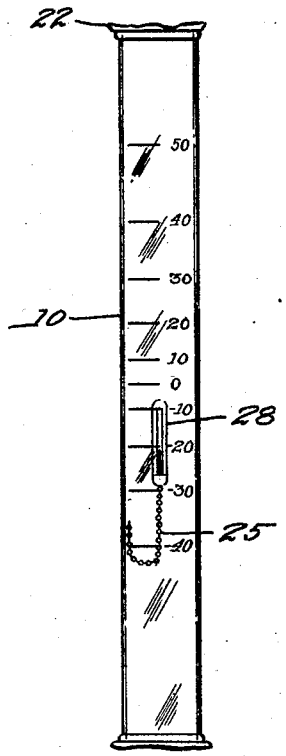
Fig. 6 is a view similar to Fig. 1 showing the use of the device with the thermometer in the float.

I am showing another form of the invention in Figs. 5 and 6. In this case the same plugs are employed and a similar tube with a different scale upon it registering temperatures at which a liquid will freeze, as from 40 degrees below zero to 30 degrees above. Also the chain 25 is connected up in the same way with the bottom of the float. In this case the float comprises a body 28 consisting of an upper and lower floating bar connected together at the sides and having depressions in their faces for receiving a thermometer 29. This thermometer is protected by the projecting heads and it is of short length. This thermometer has to be arranged so that, in its short range, the mercury or other liquid will show a long range as for example from 45 degrees to 212 degrees Fahrenheit if it is to be used for a freezometer. This instrument is employed in testing the quality of anti-freezing solution in winter in automobile radiators.

An ordinary instrument of this kind has had to go to 40 degrees below zero, for example to show at what temperature the mixture in the radiator will freeze. The error which necessarily occurs with an instrument of that kind when the temperature ranges from 32 degrees to 212 degrees Fahrenheit is as much as 30 degrees or about 20% of the length of calibration of the instrument. This is a very serious difficulty for if there is enough alcohol in the radiator for the instrument to show that it will freeze at 15 degrees below zero when the radiator is actually boiling, the freezing temperature is really 15 degrees above zero and that is what the instrument would indicate when the solution is cold.

In this case I have provided the visible thermometer in the float of the hydrometer and arranged it so that the reading will always be accurate no matter how much the temperature fluctuates. As the temperature rises, the solution becomes lighter and the float will sink. The reading point is the top of the mercury in the thermometer. Now when the temperature rises, the mercury of the thermometer rises the same distance as the float will sink, therefore the reading point at the top of the mercury will remain constant irrespective of changes in temperature. If the temperature of the liquid rises, the float will fall but the mercury will expand and its top will remain the same so that it will indicate the specific gravity of the liquid at all temperatures and also the same freezing point.

This, as stated above, is used for the purpose of finding out at what temperature the particular mixture in the radiator will freeze. As far as I am aware, this is the only instrument that will show, without material error, the same reading when the liquid is at normal temperature or at the boiling point.

In battery readings, the temperature does not change enough to warrant attention to the mercury reading. Nevertheless it works in the same way.

It will be seen that on account of the placing of the scale directly on the transparent tube and giving it a longer range of reading, it is easier and clearer to read and more accurate than is the case with the type of hydrometer in which the scale is on the float. It is more accurate because as the float is under the solution capillary action cannot make the solution creep on side of transparent tube or float and the reading therefore is more accurate. Furthermore, the float being under the level of the solution at the time of the reading, it cannot stick on the side of the transparent tube of the hydrometer which in previous constructions has been a serious difficulty. When only a short portion of the float is above the solution it has been almost impossible to get the reading. Furthermore, in the use of the hydrometer for showing the freezing point of a liquid in a radiator the thermometer on the float makes the reading accurate no matter what the temperature may be of the solution being tested.

Although I have illustrated and described only two uses for the invention and two forms of the float, I am aware of the fact that other modifications can be made therein by any person skilled in the art without departing from the scope of the invention as expressed in the claims. Therefore, I do not wish to be limited to the details of either of the forms shown, but what I claim is:—

1. In a hydrometer, the combination with a tube, of a soft rubber plug at the end having a large sized perforation entirely through it, a hard plug also having a perforation through it and of conical form adapted to set into one end of the soft plug to force the soft plug against the inner surface of the glass tube, a head on the plug, a plate over the head held thereby against the bottom of the soft plug, a chain hanging from the plate and a float connected at its bottom to the other end of the chain, whereby the chain hangs down from the float at different distances according to the height of the float in the solution.

2. In a hydrometer, the combination with a transparent tube having a scale directly thereon, of a float therein and a chain connected with the bottom of the float extending downwardly therefrom and then upwardly and secured at its upper end in the tube, said float having a thermometer therein, the top of the liquid of the thermometer being used as the point at which the scale is read on the hydrometer.

3. In a hydrometer for indicating the freezing point of a solution, the combination with a transparent tube for receiving the solution, said tube having a temperature scale thereon, a float in the tube having a vertical thermometer therein of very short range calibrated so that as the float sinks, due to increase in temperature of the solution, the mercury in the thermometer will rise substantially the same distance, keeping the actual level of the mercury constant with varying temperatures, the scale being calibrated to show by the point thereon to which the mercury in the thermometer rises, the temperature at which the liquid will freeze.

In testimony whereof I have hereunto affixed my signature.

LOUIS P. LAROSE.